United States Patent
Oh et al.

(10) Patent No.: US 10,643,857 B2
(45) Date of Patent: May 5, 2020

(54) METHOD OF GENERATING LAYOUT AND METHOD OF MANUFACTURING SEMICONDUCTOR DEVICES USING SAME

(71) Applicant: SAMSUNG ELECTRONICS CO., LTD., Suwon-si, Gyeonggi-do (KR)

(72) Inventors: In Wook Oh, Suwon-si (KR); Dong Hyun Kim, Hwaseong-si (KR); Byung Sung Kim, Suwon-si (KR); Sung Keun Park, Goyang-si (KR); Ho Jun Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 67 days.

(21) Appl. No.: 15/984,614

(22) Filed: May 21, 2018

(65) Prior Publication Data

US 2019/0131139 A1    May 2, 2019

(30) Foreign Application Priority Data

Oct. 26, 2017   (KR) .......................... 10-2017-0140447

(51) Int. Cl.
*H01L 21/308* (2006.01)
*G06F 17/50* (2006.01)
(Continued)

(52) U.S. Cl.
CPC ...... *H01L 21/3086* (2013.01); *G06F 17/5072* (2013.01); *H01L 21/823431* (2013.01); *H01L 21/845* (2013.01); *H01L 29/6681* (2013.01)

(58) Field of Classification Search
CPC ............. H01L 21/82343; H01L 21/845; H01L 27/0886; H01L 27/0924; H01L 27/10826; H01L 27/10879; H01L 27/1211; H01L 29/41791; H01L 29/66795–66818; H01L 29/785–7856; H01L 2029/7857–7858; H01L 2924/13067; H01L 29/04–045; H01L 29/16–1608; H01L 29/18–185; H01L 29/22–2206; H01L 29/36–365; H01L 21/823431; G06F 17/5072
See application file for complete search history.

(56) References Cited

U.S. PATENT DOCUMENTS

| | | |
|---|---|---|
| 8,799,833 B2 | 8/2014 | Wann et al. |
| 8,881,084 B2 | 11/2014 | Shen et al. |

(Continued)

*Primary Examiner* — William F Kraig
*Assistant Examiner* — Khatib A Rahman
(74) *Attorney, Agent, or Firm* — Lee IP Law, PC

(57) ABSTRACT

A method of generating a layout and manufacturing a semiconductor device, including receiving a design layout of a semiconductor device including active fins; extracting a design rule of the active fins from the design layout; forming fin lines overlapping the active fins such that the fin lines have a length that is greater than a length of the active fins, wherein the fin lines continuously extend from a position adjacent to one edge of a layout region of the semiconductor device toward another edge, and are formed in an entirety of the layout region of the semiconductor device; forming a mandrel pattern layout in an entirety of the layout region of the semiconductor device, using the fin lines; and forming a cut pattern layout in the entirety of the layout region of the semiconductor device, using the active fins.

19 Claims, 19 Drawing Sheets

(51) Int. Cl.
  *H01L 21/8234* (2006.01)
  *H01L 29/66* (2006.01)
  *H01L 21/84* (2006.01)

(56) References Cited

U.S. PATENT DOCUMENTS

| | | | |
|---|---|---|---|
| 9,105,467 B2 | 8/2015 | Lee et al. | |
| 9,122,835 B2 | 9/2015 | Tung | |
| 9,184,101 B2 | 11/2015 | Lo et al. | |
| 9,634,001 B2 | 4/2017 | Wann et al. | |
| 9,842,182 B2* | 12/2017 | Baek | G06F 17/5072 |
| 2012/0273899 A1* | 11/2012 | Wann | G06F 17/5068 |
| | | | 257/401 |
| 2012/0278776 A1* | 11/2012 | Lei | H01L 21/82382 |
| | | | 716/111 |
| 2012/0278777 A1* | 11/2012 | Lin | H01L 27/0207 |
| | | | 716/111 |
| 2013/0174103 A1* | 7/2013 | Shieh | H01L 21/82343 |
| | | | 716/54 |
| 2014/0325466 A1 | 10/2014 | Ke et al. | |
| 2017/0017745 A1* | 1/2017 | Wang | G06F 17/5068 |

\* cited by examiner

METHOD OF GENERATING LAYOUT AND METHOD OF MANUFACTURING SEMICONDUCTOR DEVICES USING SAME

CROSS-REFERENCE TO RELATED APPLICATION

Korean Patent Application No. 10-2017-0140447, filed on Oct. 26, 2017, in the Korean Intellectual Property Office, and entitled: "Method of Generating Layout and Method of Manufacturing Semiconductor Devices Using Same," is incorporated by reference herein in its entirety.

BACKGROUND

1. Field

Embodiments relate to a method of generating a layout and a method of manufacturing semiconductor devices using the same.

2. Description of the Related Art

With the trend for high degrees of integration in semiconductor devices, transistors have been reduced in size, and the short channel effect thereof is being increased. Fin Field-effect transistor (FinFET) structures have been proposed to curb the short channel effect of transistors.

SUMMARY

The embodiments may be realized by providing a method of generating a layout, the method including receiving a design layout of a semiconductor device including active fins; extracting a design rule of the active fins from the design layout; forming fin lines overlapping the active fins such that the fin lines have a length that is greater than a length of the active fins, wherein the fin lines continuously extend from a position adjacent to one edge of a layout region of the semiconductor device toward another edge, and are formed in an entirety of the layout region of the semiconductor device; forming a mandrel pattern layout in an entirety of the layout region of the semiconductor device, using the fin lines; and forming a cut pattern layout in the entirety of the layout region of the semiconductor device, using the active fins.

The embodiments may be realized by providing a method of forming a layout, the method including receiving a design layout of a semiconductor device, the semiconductor device including a first region including first active fins and a second region including second active fins; extracting a first design rule of the first active fins from the design layout; forming first fin lines overlapping the first active fins included in the first region such that the first fin lines have a greater length than the first active fins, wherein the first fin lines continuously extend from a position adjacent to one edge of the first region toward another edge, and ends of at least some of the first fin lines are spaced apart from a boundary of the second region; forming a first mandrel pattern layout on an entirety of the first region, using the first fin lines; and forming a first cut pattern layout on the entirety of the first region, using the first active fins.

The embodiments may be realized by providing a method of manufacturing a semiconductor device, the method including receiving a design layout of the semiconductor device including active fins; extracting a design rule of the active fins from the design layout; forming, in the semiconductor device, fin lines overlapping the active fins and extending to have a greater length than the active fins, wherein the fin lines continuously extend from a position adjacent to one edge of the semiconductor device toward another edge; forming a mandrel pattern layout, using the fin lines; forming a cut pattern layout, using the active fins; forming a first photomask with the mandrel pattern layout; forming a second photomask with the cut pattern layout; and forming the active fins by patterning a substrate, using the first photomask and the second photomask.

BRIEF DESCRIPTION OF DRAWINGS

Features will be apparent to those of skill in the art by describing in detail exemplary embodiments with reference to the attached drawings in which.

DETAILED DESCRIPTION

Figure 1:
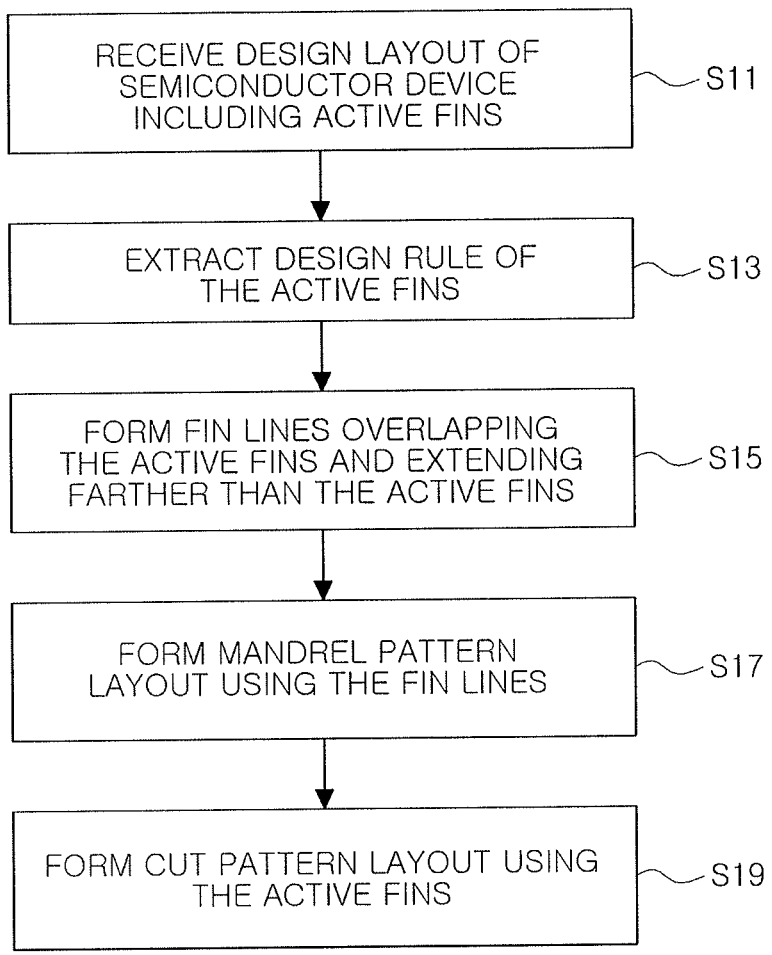
FIG. 1 illustrates a flowchart of a method of generating a layout of a semiconductor device, according to an exemplary embodiment.

FIG. 1 illustrates a flowchart of a method of generating a layout of a semiconductor device, according to an exemplary embodiment. FIGS. 2 through 6 illustrate plan views of stages in a method of generating a layout of a semiconductor device, according to an exemplary embodiment.

The method of generating a layout of a semiconductor device, according to an exemplary embodiment, will be described with reference to FIGS. 1 through 6.

Figure 2:
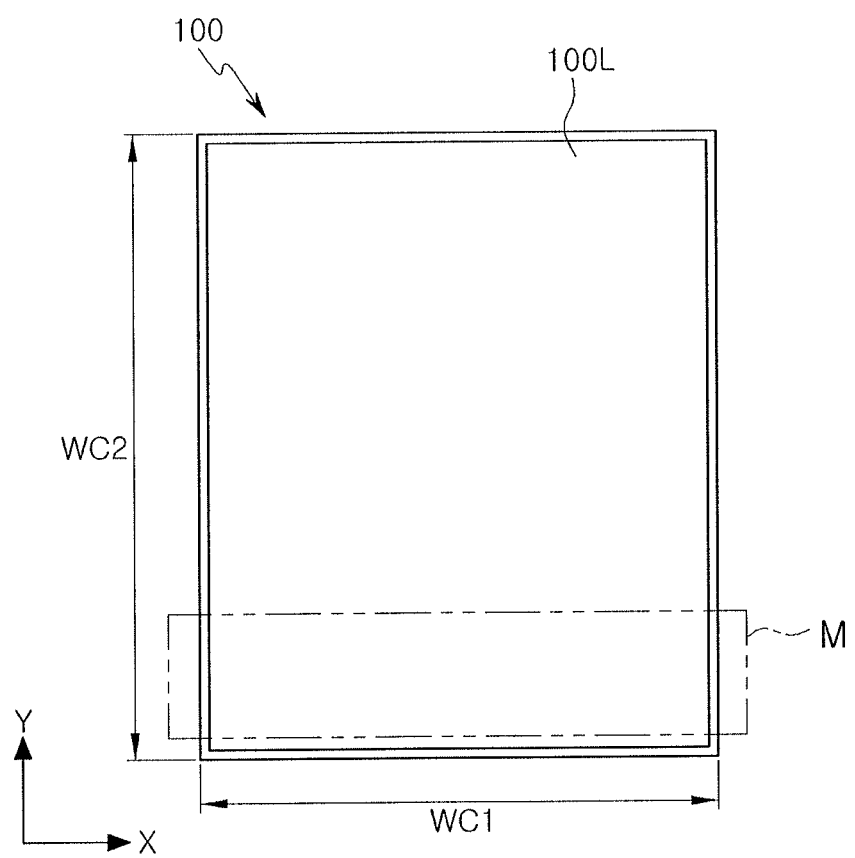
FIGS. 2 through 6 illustrate plan views of stages in a method of generating a layout of a semiconductor device, according to an exemplary embodiment.

Referring to FIGS. 1 and 2, a computer device performing a layout generation operation may receive a design layout of a semiconductor device 100 (S11).

The design layout of the semiconductor device 100 may include layouts having various patterns for fabricating the semiconductor device. The semiconductor device 100 may include transistors having a fin field-effect transistor (FinFET) structure. The semiconductor device may be a device to which a global active fin scheme may be applied. The transistors having a FinFET structure may include active fins and gate electrodes. The design layout of the semiconductor device 100 may include a layout of the active fins and a layout of the gate electrodes.

The semiconductor device 100 may have a first width WC1 in a first direction (e.g., an X-axis direction), and a second width WC2 in a second direction (e.g., a Y-axis direction).

The semiconductor device 100 may include a layout region 100L spaced apart from a boundary or edge of the semiconductor device 100.

Figure 3:
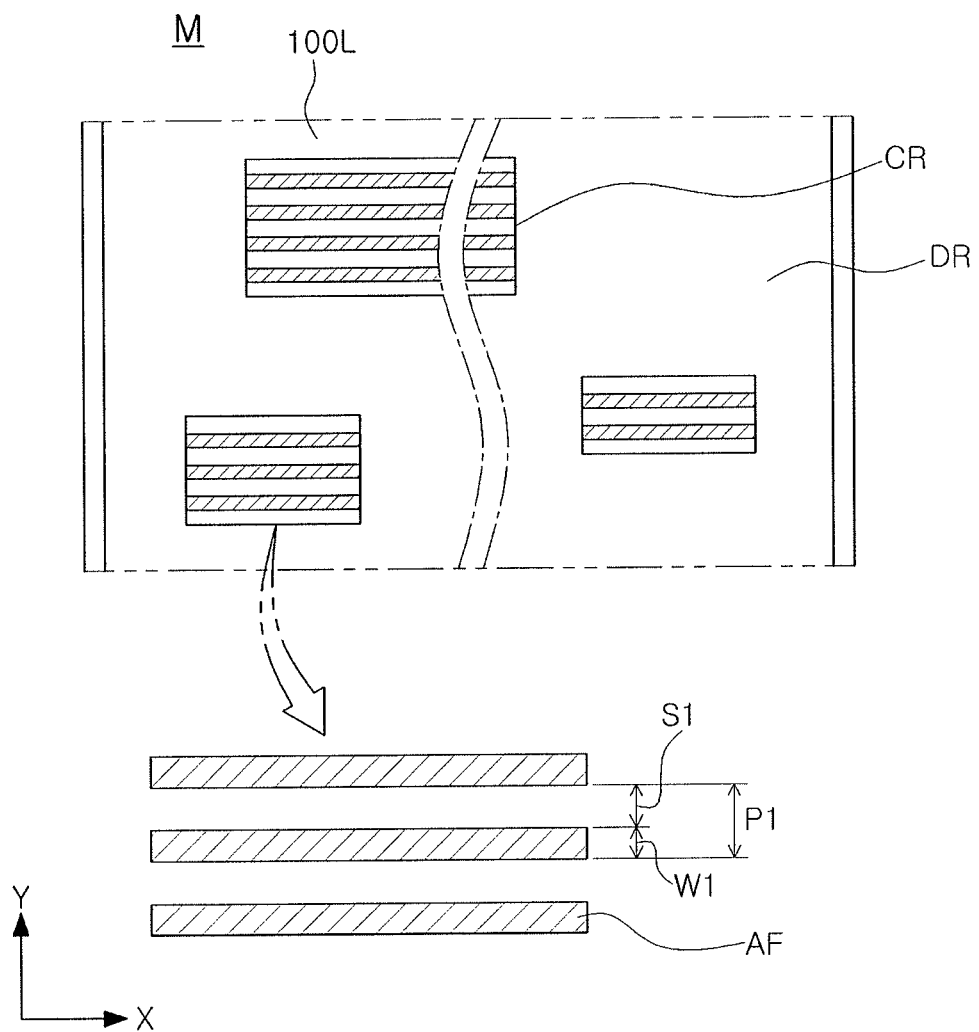

FIG. 3 illustrates an enlarged view of region "M" of FIG. 2. Referring to FIGS. 1 and 3, a design rule of the active fins AF may be extracted from the design layout of the semiconductor device 100 (S13).

The semiconductor device 100 may include a circuit region CR and a dummy region DR within the layout region 100L. The circuit region CR may include the active fins AF extending in the first direction. FIG. 3 illustrates an example of an arrangement of the circuit region CR and the dummy region DR, which may be modified in various ways.

In the circuit region CR, the active fins AF may be repeatedly disposed (e.g., spaced apart from one another) at a pitch P1 in the second direction intersecting the first direction. The active fins AF may have a fin width W1, and may be spaced apart from each other at a fin interval S1 in the second direction. The pitch P1 may be a sum of the fin width W1 of each of the active fins AF and the fin interval S1 between the active fins AF.

The extracting of the design rule of the active fins AF may include extracting the fin width W1 and the fin interval S1.

Figure 4:
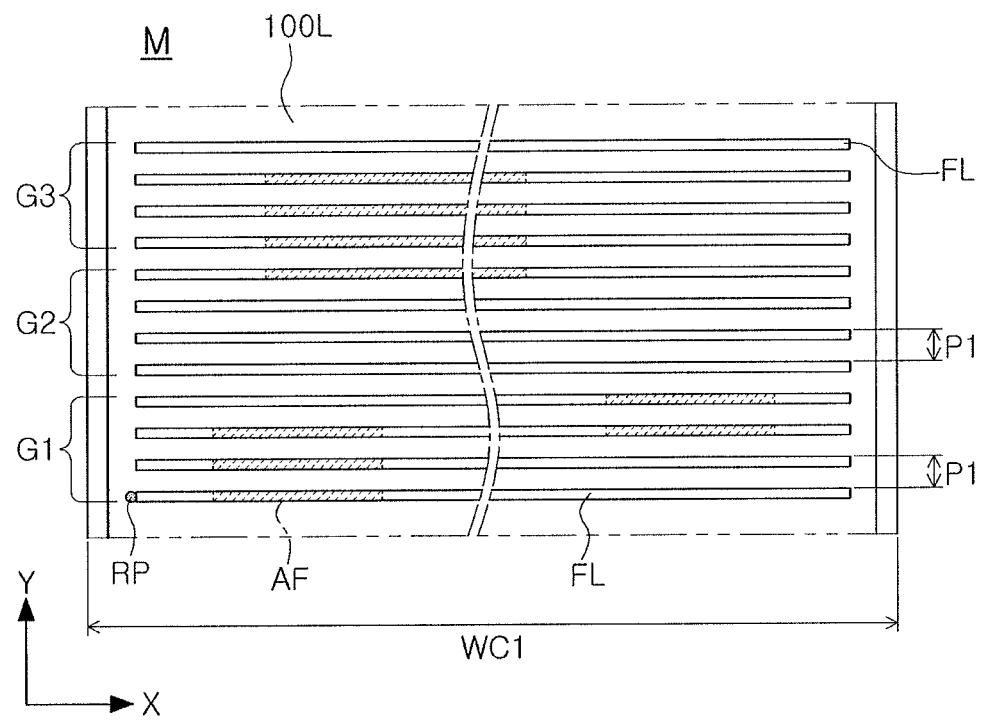

Referring to FIGS. 1 and 4, fin lines FL may be formed to overlap the active fins AF and to have a length that is greater than a length of the active fins AF (S15), e.g., in the first direction.

The fin lines FL may continue to or continuously extend from a position adjacent to one edge of the layout region 100L of the semiconductor device 100 (e.g., a left-side edge in FIG. 4) toward the other edge (e.g., a right-side edge in FIG. 4), and may be formed in an entirety of the layout region 100L of the semiconductor device 100. The fin lines FL may continue to or continuously extend in the circuit region CR and the dummy region DR. A portion of the fin lines FL (e.g., some of the fin lines FL) may not overlap the active fins AF, and may continue to or continuously extend in the dummy region DR to have the same length as the fin line FL adjacent to the portion or some of the fin lines FL.

The forming of the fin lines FL may include setting a reference point RP within the layout region 100L of the semiconductor device 100, forming a first group G1 of the fin lines FL meeting the design rule of the active fins AF from the reference point RP, and additionally forming other groups, e.g., second and third groups G2 and G3, of the fin lines FL in the layout region 100L of the semiconductor device 100, while following the design rule.

The reference point RP may be positioned collinear to any one of the active fins AF, and may be disposed in a position adjacent to the one edge (e.g., the left-side edge in FIG. 4) of the layout region 100L of the semiconductor device 100.

In an implementation, each group, e.g., the first, second, or third group G1, G2, or G3 may include four of the fin lines FL, and the four fin lines FL may have the same length in each group.

A plurality of groups of the fin lines FL may be formed in the layout region 100L of the semiconductor device 100. The fin lines FL may be formed at (e.g., spaced apart according to) the pitch P1 in the layout region 100L of the semiconductor device 100.

In an implementation, the fin lines FL may be formed in the entirety of the layout region 100L by the simple code described above. Thus, the method of generating a layout of a semiconductor device may simplify a code for generating a layout of dummy fins, and may shorten a time required for the computing device to perform the layout generation operation, as compared to a method of generating a layout by separately extending dummy fins from end portions of the active fins AF by different lengths. The four fin lines FL may have the same length, so that end portions of the fin lines FL may be aligned. Therefore, an additional code may not be required to align the end portions of the four fin lines FL belonging to each group.

Figure 5:
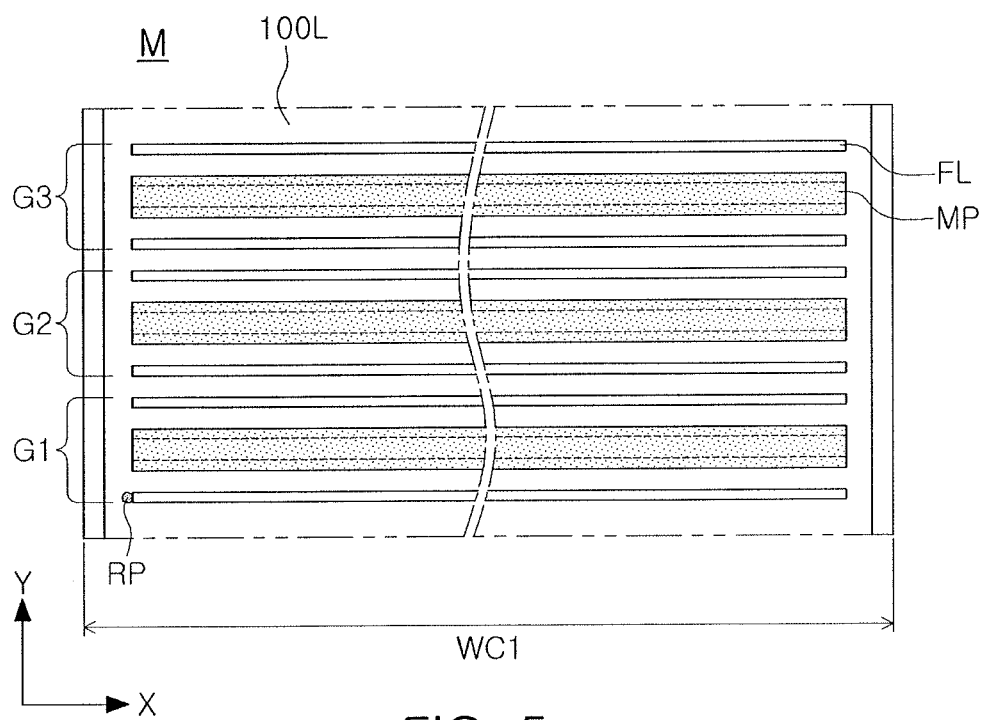

Referring to FIGS. 1 and 5, a mandrel pattern layout may be formed using the fin lines FL (S17).

The forming of the mandrel pattern layout may include forming a mandrel pattern MP having the same length as the fin lines FL, for each group of the fin lines FL, e.g., the first, second, or third group G1, G2, or G3.

In an implementation, the mandrel pattern MP may overlap two of the fin lines FL positioned in a central portion of each group.

Figure 6:
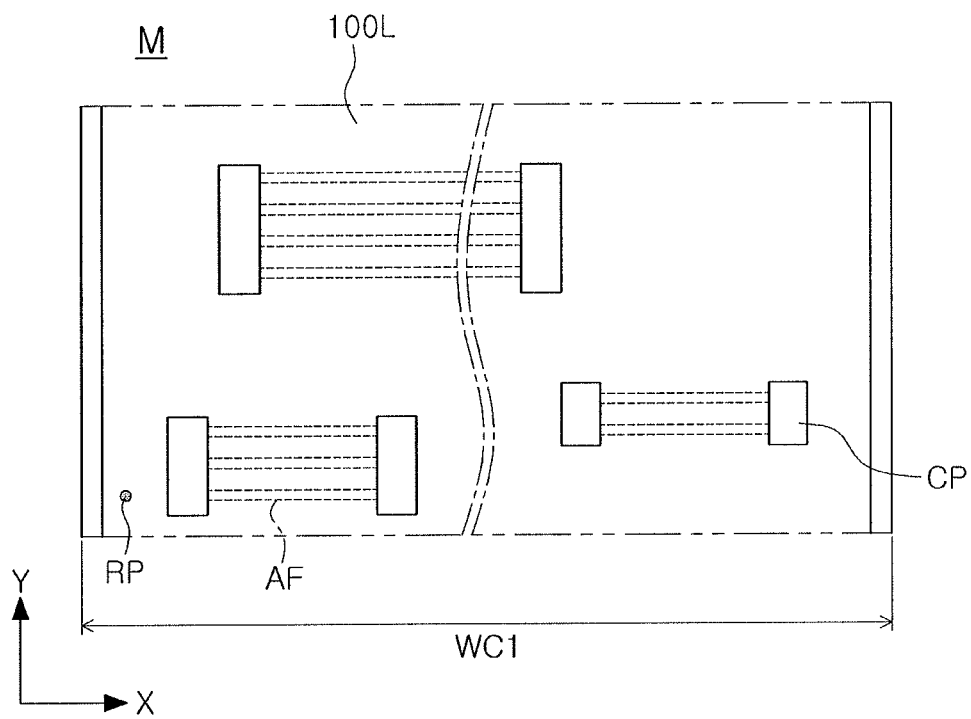

Referring to FIGS. 1 and 6, a cut pattern layout may be formed using the active fins AF (S19).

The forming the cut pattern layout may include forming cut patterns CP having a polygonal shape adjacent to ends of the active fins AF. The cut patterns may include an open region for cutting the fin lines FL. FIG. 6 illustrates an example of cut patterns CP having a quadrangular shape. In an implementation, the shape of the cut patterns CP may be modified in various ways.

The method of forming a layout, illustrated in FIGS. 3 through 6, may be a method of forming layouts for forming the active fins AF on a substrate, using a self-align quadruple patterning (SAQP) process using a spacer.

In contrast, a method of forming layouts for forming the active fins AF on a substrate, using a self-aligned double patterning (SADP) process using a spacer, will be described, with reference to FIGS. 7 and 8.

Figure 7:
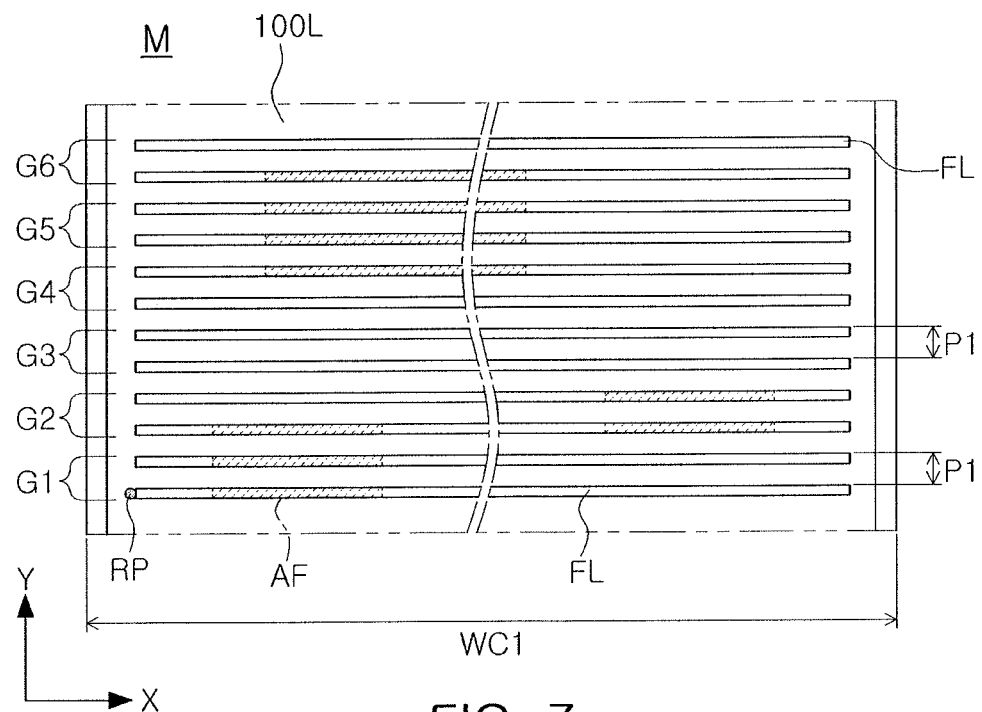
FIGS. 7 and 8 illustrate plan views of stages in a method of generating a layout of a semiconductor device, according to an exemplary embodiment.

Referring to FIGS. 1 and 7, fin lines FL may be formed to overlap the active fins AF and to have a length that is greater than the length of the active fins AF (S15).

The fin lines FL may continuously extend from a position adjacent to one edge of the layout region 100L of the semiconductor device 100 (e.g., a left-side edge in FIG. 7) toward the other edge (e.g., a right-side edge in FIG. 7), and may be formed in the entirety of the layout region 100L of the semiconductor device 100. The fin lines FL may continuously extend in the circuit region CR and the dummy region DR. A portion, some, or selected ones of the fin lines FL may not overlap the active fins AF, and may continuously extend in the dummy region DR to have the same length as the fin line FL adjacent to the portion or selected ones of the fin lines FL.

The forming of the fin lines FL may include setting a reference point RP within the layout region 100L of the semiconductor device 100, forming a first group G1 of the fin lines FL meeting the design rule of the active fins AF from the reference point RP, and additionally forming other groups, e.g., second to sixth groups G2 to G6, of the fin lines FL in the layout region 100L of the semiconductor device 100, while following the design rule.

The reference point RP may be positioned collinear to any one of the active fins AF, and may be disposed in a position adjacent to the one edge (e.g., the left-side edge in FIG. 7) of the layout region 100L of the semiconductor device 100.

In an implementation, each group, e.g., the first, second, third, fourth, fifth or sixth group G1, G2, G3, G4, G5 or G6, may include two of the fin lines FL, and the two fin lines FL may have the same length in each group.

A plurality of groups of the fin lines FL may be formed in the layout region 100L of the semiconductor device 100. The fin lines FL may be formed at the pitch P1 in the layout region 100L of the semiconductor device 100.

In an implementation, the method of generating a layout of a semiconductor device may simplify a code for generating a layout of dummy fins, and may reduce a time required for the computing device to perform the layout generation operation, as compared to a method of generating a layout by separately extending dummy fins from end portions of the active fins AF by different lengths.

Figure 8:
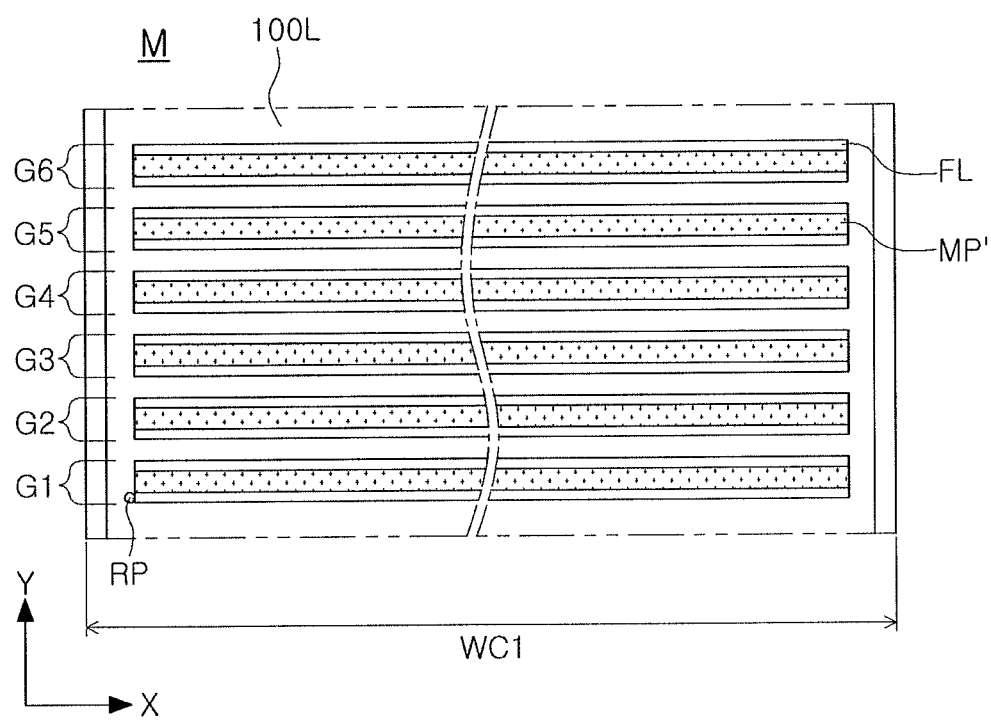

Referring to FIGS. 1 and 8, a mandrel pattern layout may be formed using the fin lines FL (S17).

The forming of the mandrel pattern layout may include forming a mandrel pattern MP having the same length as the fin lines FL, for each group, e.g., the first, second, or third group G1, G2, G3, G4, G5 or G6, of the fin lines FL.

The mandrel pattern MP may be formed in a region between two of the fin lines FL of each group. In an implementation, a width of the mandrel pattern MP may be substantially the same as an interval between the fin lines FL.

Figure 9:
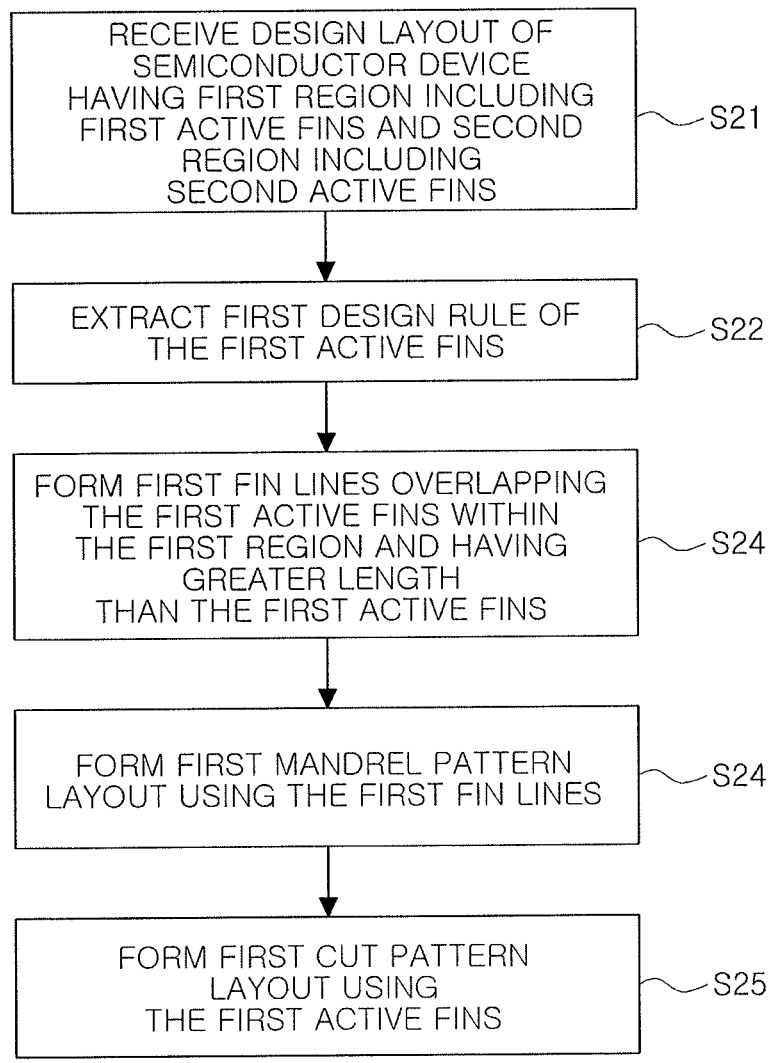
FIGS. 9 and 10 illustrate flowcharts of a method of generating a layout of a semiconductor device, according to an exemplary embodiment.
Figure 10:
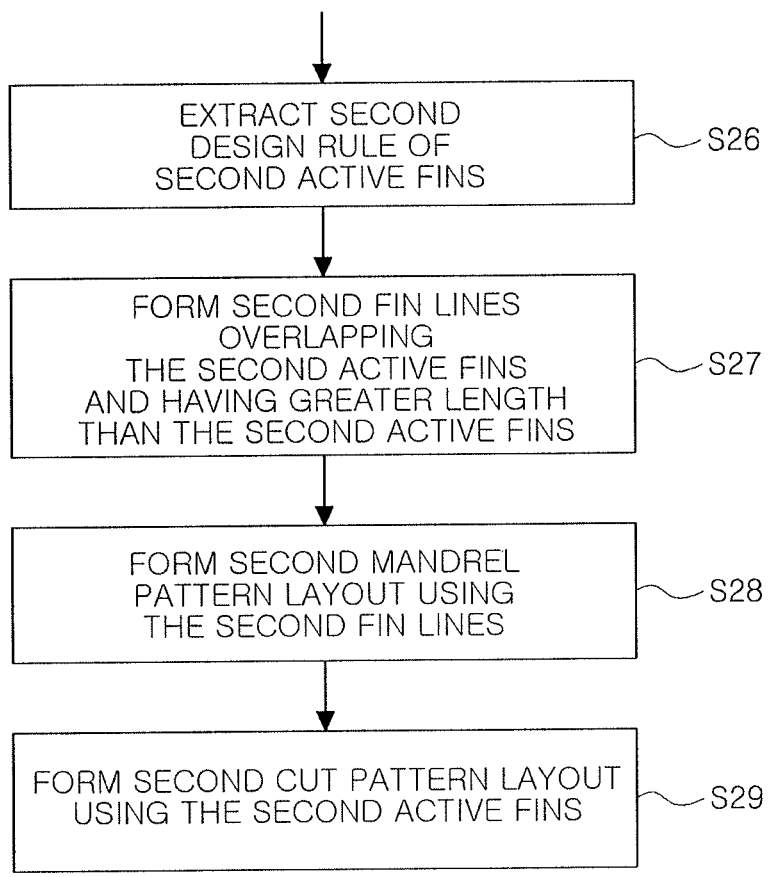

FIGS. 9 and 10 illustrate flowcharts of a method of forming a layout of a semiconductor device, according to an exemplary embodiment. FIGS. 11 through 18 illustrate plan views of stages in a method of generating a layout of a semiconductor device, according to an exemplary embodiment.

The method of generating a layout of a semiconductor device, according to an exemplary embodiment, will be described with reference to FIGS. 9 through 18.

Figure 11:
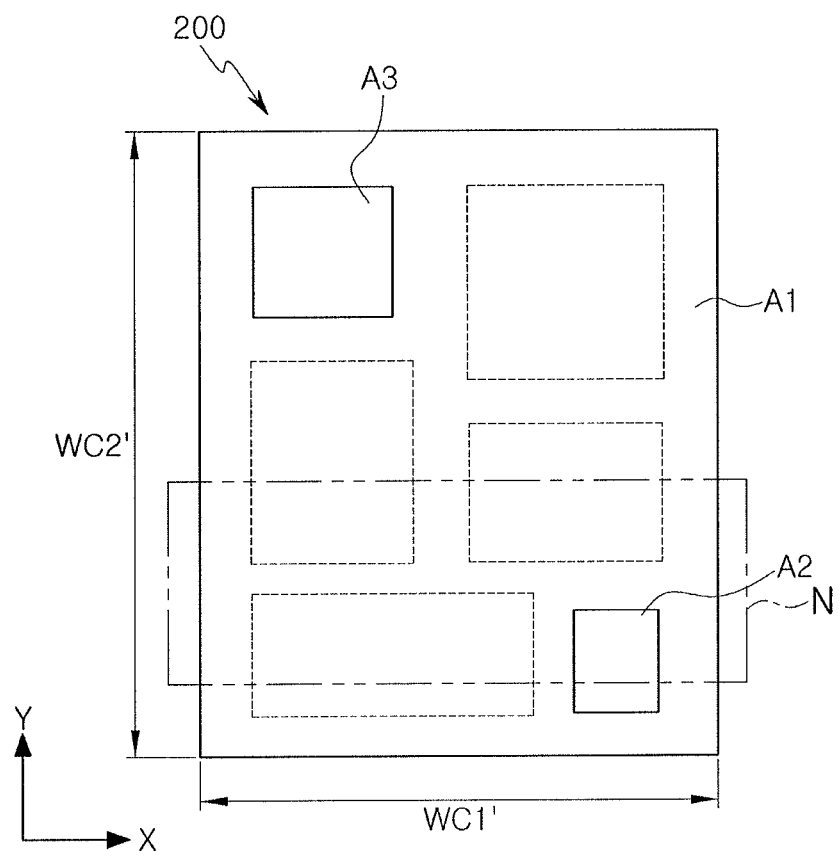
FIGS. 11 through 18 illustrate plan views of stages in a method of generating a layout of a semiconductor device, according to an exemplary embodiment.

Referring to FIGS. 9 and 11, a computer device performing a layout formation operation may receive a design layout of a semiconductor device 200 (S21).

The design layout of the semiconductor device 200 may include layouts having various patterns required to fabricate the semiconductor device. The semiconductor device 200 may be a system on chip (SOC) including various function blocks. The semiconductor device 200 may include a first region A1, a second region A2, and a third region A3 having different design rules. The first to third regions A1 to A3 may include transistors having a FinFET structure. The transistors having a FinFET structure may include active fins and gate electrodes. The design layout of the semiconductor device 200 may include a layout of the active fins and a layout of the gate electrodes. In an implementation, the first region A1 may include a plurality of function blocks (indicated by dotted lines) in which the same design rule is applied to the active fins. The function blocks may include a central processing unit (CPU), a graphics processing unit (GPU), or a digital signal processor (DSP). In an implementation, the second region A2 may be an input/output (I/O) device region, and the third region A3 may be a memory device region such as a static random access memory (SRAM).

The semiconductor device 200 may have a first width WC1' in a first direction (e.g., an X-axis direction), and a second width WC2' in a second direction (e.g., a Y-axis direction).

Figure 12:
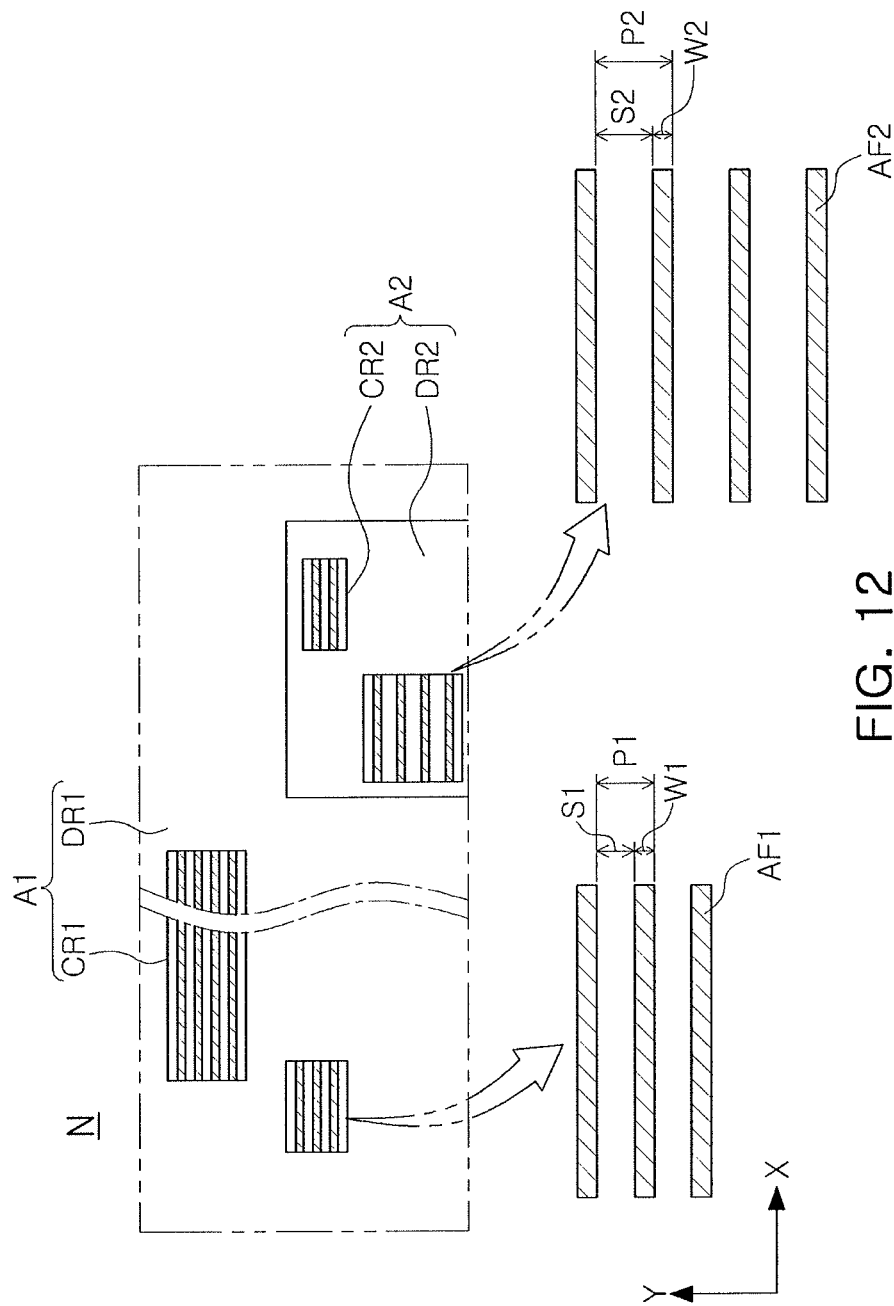

FIG. 12 illustrates an enlarged view of region "N" of FIG. 11. Referring to FIGS. 9 and 12, a design rule of first active fins AF1 may be extracted from the design layout of the semiconductor device 200 (S22).

The semiconductor device 200 may include a first circuit region CR1 and a first dummy region DR1 within the first region A1. The first circuit region CR1 may include the first active fins AF1 extending in the first direction. FIG. 12 illustrates an example of an arrangement of the first circuit region CR1 and the first dummy region DR1, which may be modified in various ways.

In the first circuit region CR1, the first active fins AF1 may be repeatedly disposed at a first pitch P1, e.g., in the second direction intersecting the first direction. The first active fins AF1 may have a first fin width W1, and may be spaced apart from each other at a first fin interval S1 in the second direction. The first pitch P1 may be the sum of the first fin width W1 of the first active fins AF1 and the first pitch P1 between the first active fins AF1.

The extracting of the design rule of the first active fins AF1 may include extracting the first fin width W1 and the first fin interval S1.

Figure 13:
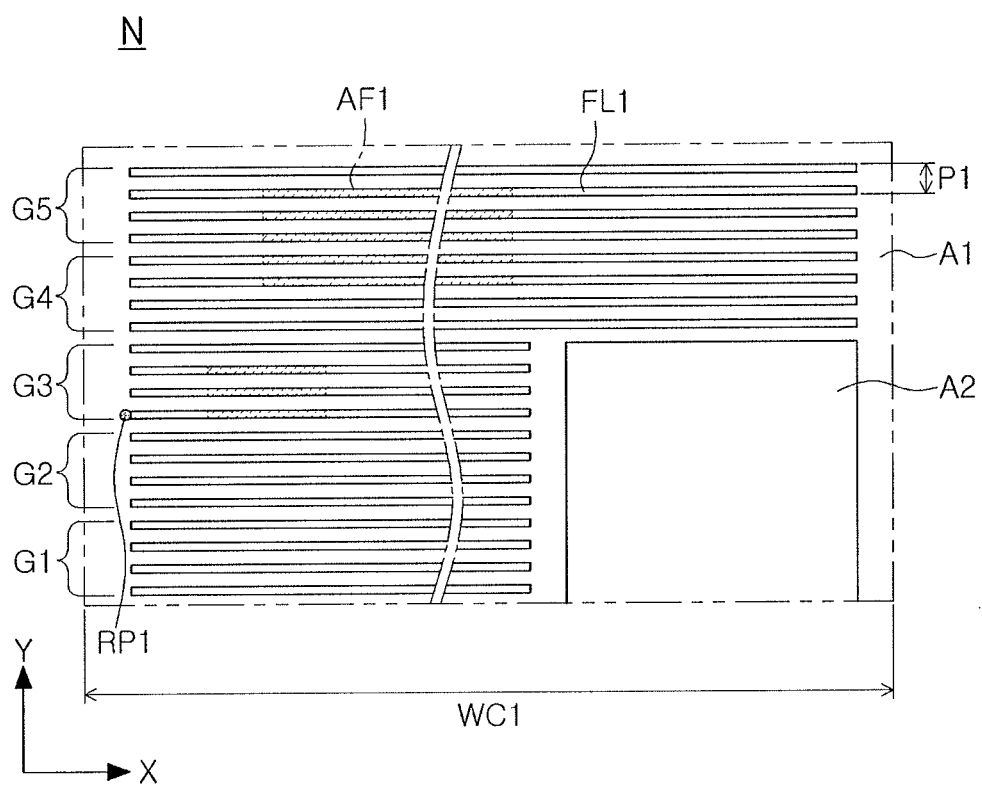

Referring to FIGS. 9 and 13, first fin lines FL1 may be formed to overlap the first active fins AF1 and to have a greater length than the first active fins AF1 (S23).

The first fin lines FL1 may continuously extend from a position adjacent to one edge of the first region A1 of the semiconductor device 200 (e.g., a left-side edge in FIG. 13) toward the other edge (e.g., a right-side edge in FIG. 13), and may be formed in an entirety of the first region A1 of the semiconductor device 200. The first fin lines FL1 may continuously extend in the first circuit region CR1 and the first dummy region DR1. A portion or selected ones of the first fin lines FL1 may not overlap the first active fins AF1, and may continuously extend in the first dummy region DR1 to have the same length as the first fin line FL1 adjacent to the selected ones of the first fin lines FL1. Ends of at least a portion of the first fin lines FL1 may be spaced apart from a boundary or edge of the second region A2.

The forming of the first fin lines FL1 may include setting a first reference point RP1 within the first region A1 of the semiconductor device 200, forming a first group G1 of the first fin lines FL1 meeting the design rule of the first active fins AF1 from the first reference point RP1, and additionally forming second to fifth groups G2 to G5 of the first fin lines FL1 in the first region A1 of the semiconductor device 200, while maintaining the design rule.

The first reference point RP1 may be positioned collinear to any one of the first active fins AF1, and may be disposed in a position adjacent to the one edge (the left-side edge in FIG. 13) of the first region A1 of the semiconductor device 200.

In an implementation, each group, e.g., the first, second, third, fourth, or fifth group G1, G2, G3, G4, or G5 may include four of the first fin lines FL1, and the first fin lines FL1 may have the same length in each group.

A plurality of groups of the first fin lines FL1 may be formed in the first region A1 of the semiconductor device 200. The first fin lines FL1 may be formed at the first pitch P1 in the first region A1 of the semiconductor device 200.

In an implementation, the method of generating a layout of a semiconductor device may simplify a code for generating a layout of dummy fins, and may shorten a time required for the computing device to perform the layout generation operation, as compared to a method of generating a layout by separately extending dummy fins from end portions of the first active fins AF1 by different lengths.

Figure 14:
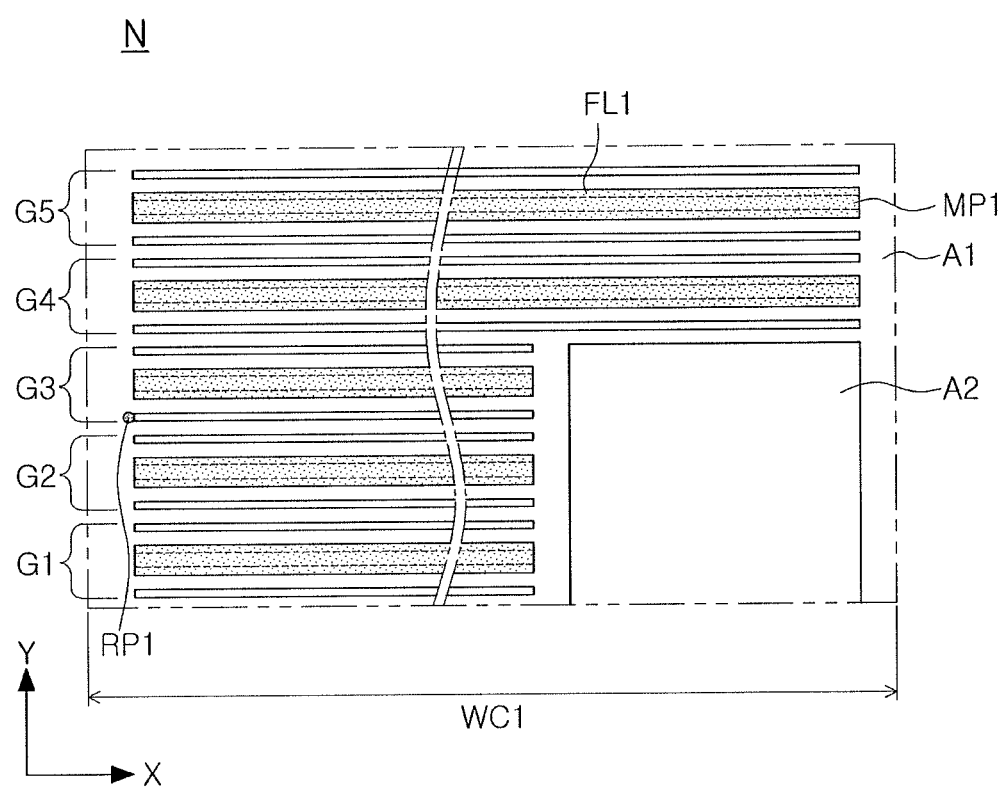

Referring to FIGS. 9 and 14, a first mandrel pattern layout may be formed using the first fin lines FL1 (S24).

The forming of the first mandrel pattern layout may include forming a first mandrel pattern MP1 having the same length as the first fin lines FL1, for each group of the first fin lines FL1, e.g., the first, second, third, fourth, or fifth group G1, G2, G3, G4, or G5.

In an implementation, the mandrel pattern MP may overlap two of the first fin lines FL1 positioned in a central portion of each group, e.g., the first, second, third, fourth, or fifth group G1, G2, G3, G4, or G5.

Figure 15:
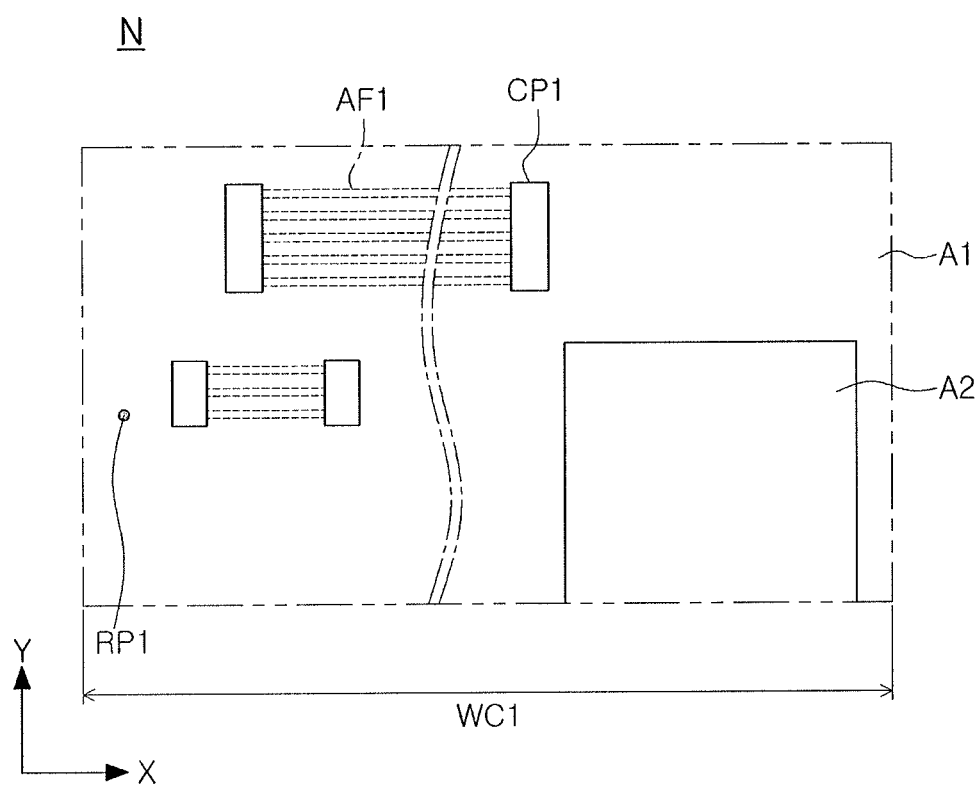

Referring to FIGS. 9 and 15, a first cut pattern layout may be formed using the first active fins AF1 (S25).

The forming the cut pattern layout may include forming first cut patterns CP1 having a polygonal shape adjacent to end portions of the first active fins AF1. The first cut patterns CP1 may include an open region for cutting the first fin lines FL1. FIG. 15 illustrates an example of the first cut patterns CP1 having a quadrangular shape. In an implementation, the shape of the first cut patterns CP1 may be modified in various ways.

Referring back to FIGS. 10 and 12, a design rule of second active fins AF2 may be extracted from the design layout of the semiconductor device 200 (S26).

The semiconductor device 200 may include a second circuit region CR2 and a second dummy region DR2 within the second region A2. The second circuit region CR2 may include the second active fins AF2 extending in the first direction. FIG. 12 illustrates an example of an arrangement of the second circuit region CR2 and the second dummy region DR2, which may be modified in various ways.

In the second circuit region CR2, the second active fins AF2 may be repeatedly disposed at a second pitch P2 in the second direction intersecting the first direction. The second active fins AF2 may have a second fin width W2, and may be spaced apart from each other at a second fin interval S2 in the second direction. The second pitch P2 may be the sum of the second fin width W2 of the second active fins AF2 and the second pitch P2 between the second active fins AF2.

The extracting of the design rule of the second active fins AF2 may include extracting the second fin width W2 and the second fin interval S2.

In contrast, the extracting of the design rule of the second active fins AF2 may be performed together with the extracting of the design rule of the first active fins AF1.

Figure 16:
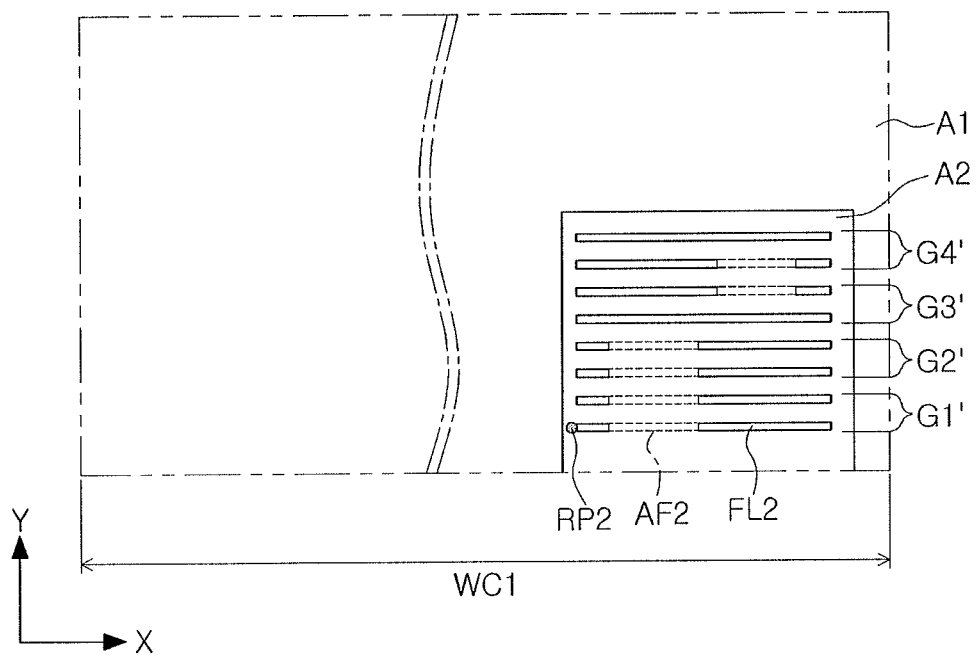

Referring to FIGS. 10 and 16, second fin lines FL2 may be formed to overlap the second active fins AF2 and to have a length that is greater than the length of the second active fins AF2 (S27).

The second fin lines FL2 may continuously extend from a position adjacent to one edge of the second region A2 of the semiconductor device 200 (e.g., a left-side edge in FIG. 16) toward the other edge (e.g., a right-side edge in FIG. 16), and may be formed in an entirety of the second region A2 of the semiconductor device 200. The second fin lines FL2 may continuously extend in the second circuit region CR2 and the second dummy region DR2. A portion or selected ones of the second fin lines FL2 may not overlap the second active fins AF2, and may continuously extend in the second dummy region DR2 to have the same length as the second fin line FL adjacent to the selected ones of the second fin lines FL2.

The forming of the second fin lines FL2 may include setting a second reference point RP2 within the second region A2 of the semiconductor device 200, forming a first group G1' of the second fin lines FL2 meeting the design rule of the second active fins AF2 from the second reference point RP2, and additionally forming second to fourth groups G2' to G4' of the second fin lines FL2 in the second region A2 of the semiconductor device 200, while maintaining the design rule.

The second reference point RP2 may be positioned collinear to any one of the second active fins AF2, and may be disposed in a position adjacent to the one edge (e.g., the left-side edge in FIG. 16) of the second region A2 of the semiconductor device 200.

In an implementation, each group, e.g., the first, second, third, or fourth group G1', G2', G3', or G4' may include two of the second fin lines FL2, and the second fin lines FL2 may have the same length in each group.

A plurality of groups of the second fin lines FL2 may be formed in the second region A2 of the semiconductor device 200. The second fin lines FL2 may be formed at the second pitch P2 in the second region A2 of the semiconductor device 200.

In an implementation, the method of generating a layout of a semiconductor device may simplify a code for generating a layout of dummy fins, and may shorten a time required for the computing device to perform the layout generation operation, as compared to a method of generating a layout by separately extending dummy fins from end portions of the second active fins AF2 by different lengths.

Figure 17:
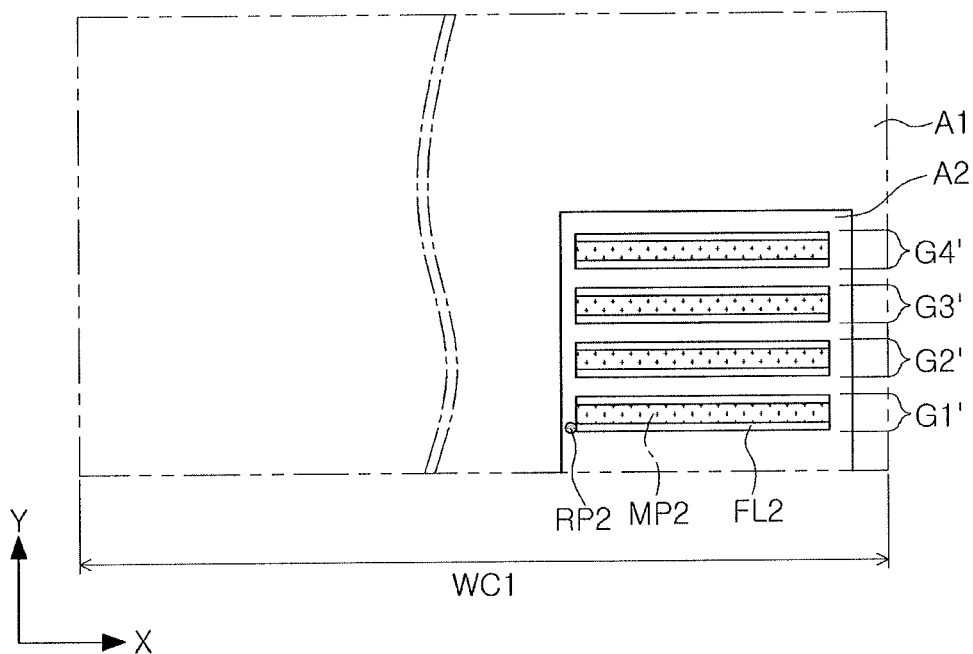

Referring to FIGS. 10 and 17, a second mandrel pattern layout may be formed using the second fin lines FL2 (S28).

The forming of the second mandrel pattern layout may include forming a second mandrel pattern MP2 having the same length as the second fin lines FL2, for each group of the second fin lines FL2, e.g., the first, second, third, or fourth group of G1', G2', G3', or G4'.

In an implementation, the second mandrel pattern MP2 may be formed in a region between two of the second fin lines FL2 of each group. A width of the second mandrel pattern MP2 may be substantially the same as an interval between the second fin lines FL2.

Figure 18:
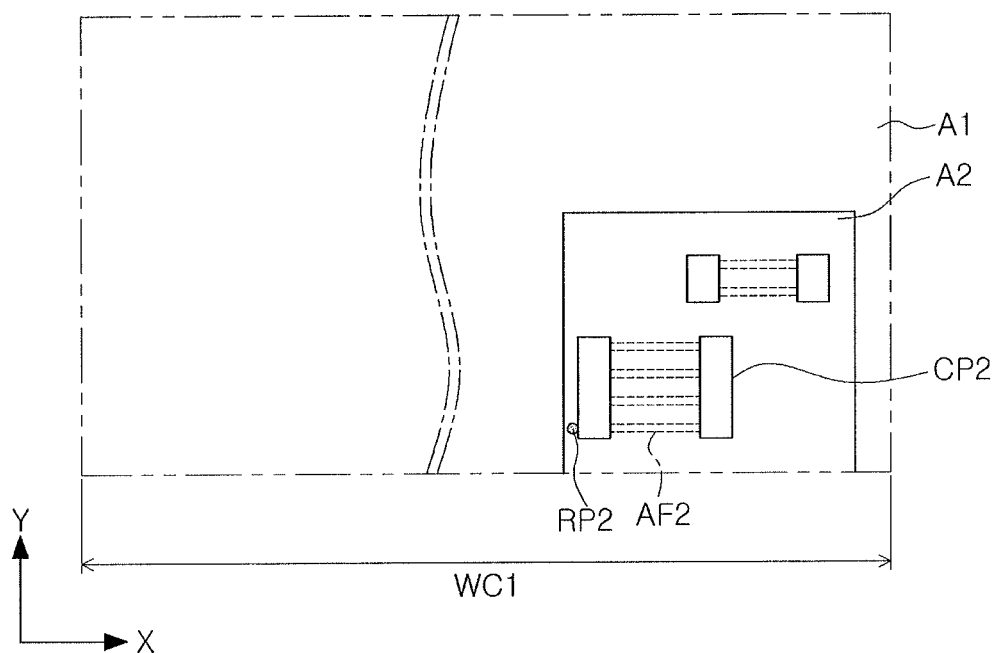

Referring to FIGS. 10 and 18, a second cut pattern layout may be formed using the second active fins AF2 (S29).

Second cut patterns CP2 having a polygonal shape adjacent to end portions of the second active fins AF2 may be formed. The second cut patterns CP2 may include an open region for cutting the second fin lines FL2. FIG. 18 illustrates an example of the second cut patterns CP2 having a quadrangular shape. In an implementation, the shape of the second cut patterns CP2 may be modified in various ways.

The exemplary embodiment, described above with reference to FIGS. 9 through 18, illustrate the method of forming layouts used when the first active fins AF1 in first region A1 may be formed by a SAQP process using a spacer, and the second active fins AF2 in the second region A2 may be formed by a SADP process using a spacer.

In an implementation, an embodiment may be modified and applied when both first active fins of the first region A1 and second active fins of the second region A2 may be formed by a SAQP process or a SADP process or when first active fins of the first region A1 may be formed by a SADP process and second active fins of the second region A2 may be formed by a SAQP process.

Figure 19:
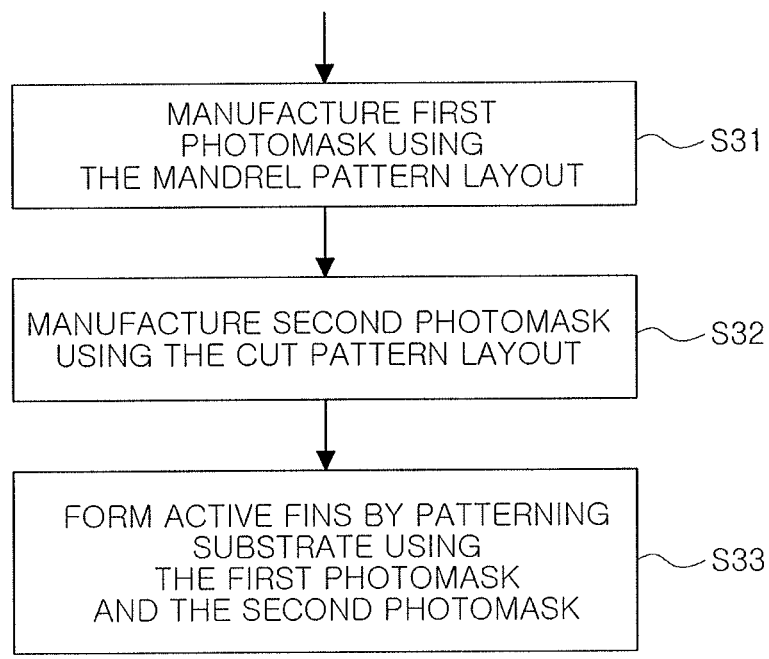
FIGS. 19 and 20 illustrate flowcharts of a method of manufacturing a semiconductor device, according to an exemplary embodiment.
Figure 20:
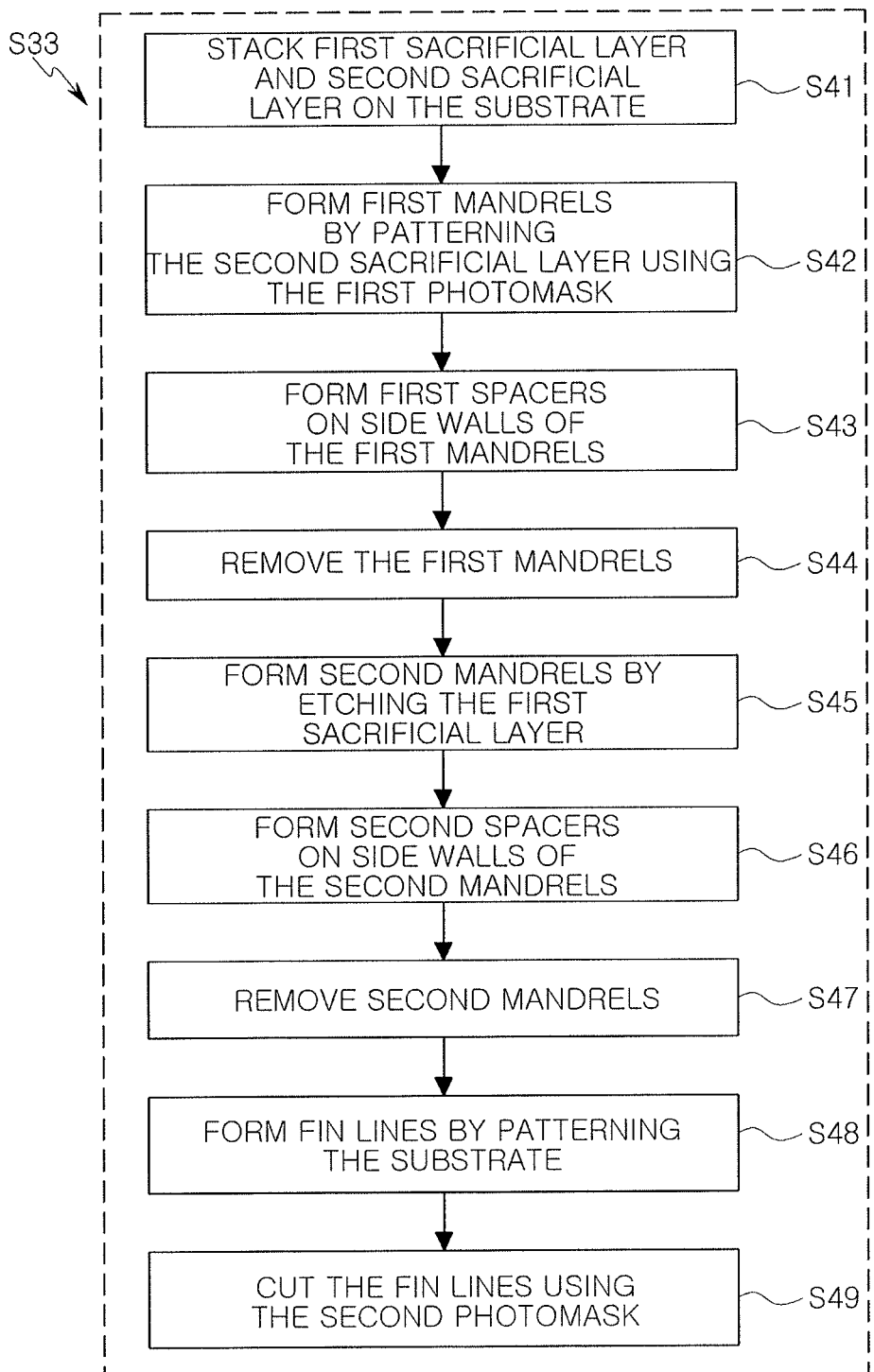

FIGS. 19 and 20 illustrate flowcharts of a method of manufacturing a semiconductor device, according to an exemplary embodiment.

Referring to FIG. 19, subsequent to forming the cut pattern layout using the active fins AF of FIG. 1 (S19), a first photomask may be manufactured using the mandrel pattern layout (S31). A second photomask may be manufactured using the cut pattern layout (S32). Active fins may be formed on the substrate by patterning the substrate using the first photomask and the second photomask (S33).

The forming of the active fins on the substrate by patterning the substrate using the first photomask and the second photomask (S33) will be described in detail, with reference to FIG. 20.

Referring to FIG. 20, a hard mask layer, a first sacrificial layer, and a second sacrificial layer may be sequentially formed on the substrate (S41).

The substrate may be a semiconductor substrate, such as a silicon wafer. In an implementation, the substrate may be a silicon on insulator (SOI) substrate.

The hard mask layer may be formed of at least one of a silicon-containing material, e.g., a silicon oxide (SiOx), a silicon oxynitride (SiON), a silicon nitride (SixNy), tetraethyl orthosilicate (TEOS), or polycrystalline silicon, a carbon-containing material, e.g., an amorphous carbon layer (ACL) or a spin-on hardmask (SOH), or a metal. In an implementation, the hard mask layer may have a structure in which a silicon nitride, a silicon oxide, and polycrystalline silicon are stacked.

The first sacrificial layer and the second sacrificial layer may include, e.g., polycrystalline silicon, an ACL, or a SOH.

An anti-reflective layer may further be formed on the first sacrificial layer and the second sacrificial layer. The anti-reflective layer may be formed of, e.g., a silicon oxynitride (SiON).

Subsequently, first mandrels may be formed by patterning the second sacrificial layer using the first photomask (S42).

The second sacrificial layer may be covered by a photoresist (PR) layer, and first PR patterns having a line shape may be formed by a photolithography process using the first photomask. The first mandrels may be formed on the first sacrificial layer by anisotropically etching the second sacrificial layer using the first PR patterns as an etching mask.

Subsequently, first spacers may be formed on side walls of the first mandrels (S43).

A first spacer material layer conformally covering the first mandrels may be formed, and then an etch back process may be performed thereon so that the first spacers may be formed on the side walls of the first mandrels.

The first spacer material layer may be formed of a material having etch selectivity with respect to the first mandrels. For example, when the first mandrels are formed of any one of an ACL or a SOH, the first spacer material layer may be formed of a silicon oxide or a silicon nitride.

Subsequently, the first mandrels may be selectively removed (S44). Thus, the first spacers may remain in line form on the first sacrificial layer.

Subsequently, second mandrels may be formed on the hard mask layer by etching the first sacrificial layer using the first spacers as an etching mask (S45).

Subsequently, second spacers may be formed on side walls of the second mandrels (S46).

A second spacer material layer conformally covering the second mandrels may be formed, and then an etch back process may be performed thereon so that the second spacers may be formed on the side walls of the second mandrels.

Subsequently, the second mandrels may be selectively removed (S47). Thus, the second spacers may remain on the hard mask layer in line form.

Subsequently, fin lines may be formed by patterning the substrate using the second spacers as an etching mask (S48).

The fin lines having a pitch P1 may be formed on the substrate by anisotropically etching the hard mask layer and the substrate.

Subsequently, the fin lines may be cut using the second photomask (S49). Thus, active fins and dummy fins spaced apart from each other may be formed such that the active fins and the dummy fins may be disposed at the pitch P1.

Figure 21:
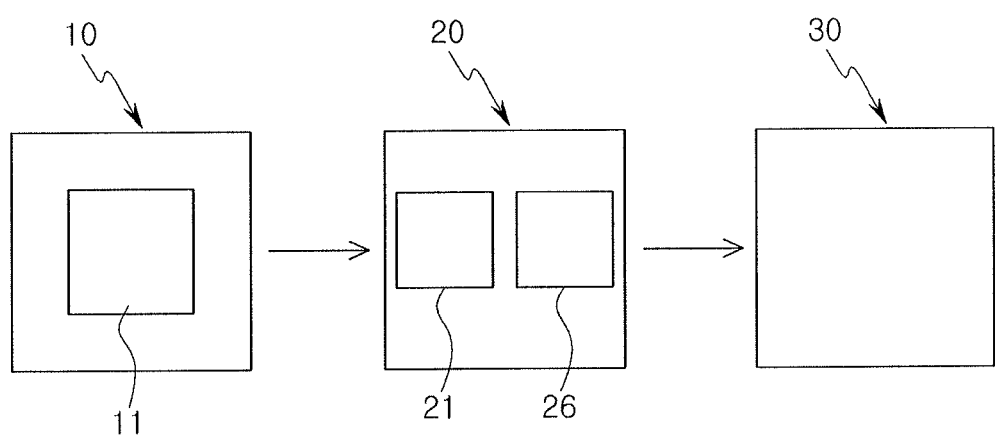
FIG. 21 illustrates a system for fabricating a semiconductor device according to an exemplary embodiment.

FIG. 21 illustrates a system for fabricating a semiconductor device according to an exemplary embodiment.

Referring to FIG. 21, a system for fabricating a semiconductor device (or an integrated circuit (IC)) may include a designing of the semiconductor device (10), a manufacturing of a mask (20), and a manufacturing of the semiconductor device (30).

The designing of the semiconductor device (10) may include generating a design layout of the semiconductor device by a computer device for design 11. The computer device for design 11 may include a design tool able to design the semiconductor device. The design layout may include various geometric patterns for forming constituent elements (e.g., active fins, gate electrodes, or the like) forming the semiconductor device. The design layout may be represented in GDSII file format, DFII file format, or computer-readable other proper data formats.

The manufacturing of the mask (20) may include manufacturing photomasks used to form various patterns of the semiconductor device using the design layout.

The design layout may be modified to help improve process margins in processes of manufacturing the constituent elements forming the semiconductor device (e.g., a photolithography process, an etching process, or a chemical mechanical polishing (CMP) process). New patterns of layouts required for the manufacturing processes may be formed using the design layout. The modifying of the design layout and the forming of the new patterns of layouts may be performed by a computer device for mask 21, and a mask layout may be formed as a result of the modifying and forming. The computer device for mask 21 may include a layout tool able to modify or form a layout. The computer device for mask 21 may include a processor executing various instructions performed in the layout tool, a memory storing data, such as the layout tool, the design layout, and the mask layout, and a communications module transmitting or receiving the data. The processor, the memory, and the communications module may communicate with one another. The mask layout may be represented in GDSII file format, DFII file format, or other proper computer-readable data formats. The operations (S11, S13, S15, S17, and S19) according to the above-mentioned exemplary embodiment, and the operations (S21, S22, S23, S24, S25, S26, S27, S28, and S29) according to the above-mentioned other exemplary embodiment may be performed by the computer device for mask 21.

Photomasks having various patterns of the mask layout may be manufactured by a mask manufacturing apparatus 26. The operations (S31, S32) according to the above-mentioned exemplary embodiment may be performed by the mask manufacturing apparatus 26.

The manufacturing of the semiconductor device (30) may include forming the constituent elements of the semiconductor device by various manufacturing apparatuses (for example, a photolithography apparatus, a deposition apparatus, an etching apparatus, and an ion implantation apparatus). The operation (S33) according to the above-mentioned exemplary embodiment may be performed in the manufacturing of the semiconductor device (30).

The photomasks may be used in the photolithography process using the photolithography apparatus. The operations (S42, S49) according to the above-mentioned exemplary embodiment may be performed by the photolithography apparatus.

As is traditional in the field, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope herein. Further, the blocks, units and/or modules of the embodiments may be physically combined into more complex blocks, units and/or modules without departing from the scope herein.

By way of summation and review, as unexpected defects occur in fabricating compact transistors having FinFET structures, yield could be reduced and productivity could also be degraded.

As set forth above, according to exemplary embodiments, a method of generating a layout and a method of manufacturing semiconductor devices using the same may help reduce the size of a layout file for forming active fins and dummy fins, and may help shorten a time required to generate a layout for forming active fins and dummy fins.

The embodiments may provide a method of efficiently generating layouts for forming active fins and dummy fins.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of generating a layout, the method comprising:
    receiving a design layout of a semiconductor device including active fins;
    extracting a design rule of the active fins from the design layout;
    forming fin lines completely overlapping the active fins such that the fin lines have a length that is greater than a length of the active fins in a first direction, wherein the fin lines continuously extend from a position directly adjacent to one edge of a layout region of the semiconductor device toward a position directly adjacent to another edge, and are formed in an entirety of the layout region of the semiconductor device;
    forming a mandrel pattern layout in an entirety of the layout region of the semiconductor device, using the fin lines; and
    forming a cut pattern layout in the entirety of the layout region of the semiconductor device, using the active fins.

2. The method as claimed in claim 1, wherein forming the fin lines includes:
    setting a reference point within the layout region of the semiconductor device;
    forming a group of fin lines meeting the design rule from the reference point; and
    additionally forming other groups of fin lines in the layout region of the semiconductor device, while following the design rule.

3. The method as claimed in claim 2, wherein the reference point:
    is positioned collinear to any one of the active fins, and
    is set as a point away from the one edge of the layout region of the semiconductor device by a predetermined distance.

4. The method as claimed in claim 2, wherein:
    each group of fin lines includes four fin lines, and
    the four fin lines in each group have the same length.

5. The method as claimed in claim 4, wherein:
    forming the mandrel pattern layout includes forming, for each group, a mandrel pattern having a same length as the fin lines, and
    the mandrel pattern overlaps two of the active fins positioned in a central portion of each group.

6. The method as claimed in claim 2, wherein:
    each group of fin lines includes two fin lines, and
    the two fin lines in each group have the same length.

7. The method as claimed in claim 6, wherein:
    forming the mandrel pattern layout includes forming, for each group, a mandrel pattern having a same length as the fin lines, and
    the mandrel pattern is disposed in a region between two of the fin lines.

8. A method of forming a layout, the method comprising:
    receiving a design layout of a semiconductor device, the semiconductor device including a first region including first active fins extending linearly in a first direction and spaced apart from one another by a first distance in a second direction crossing the first direction and a second region including second active fins extending linearly in the first direction and spaced apart from one another by a second distance in the second direction, the second distance being different from the first distance;
    extracting a first design rule of the first active fins from the design layout;
    forming first fin lines completely overlapping the first active fins included in the first region such that the first fin lines have a greater length than the first active fins in the first direction, wherein the first fin lines continuously extend from a position adjacent to one edge of the first region toward another edge, and ends of at least some of the first fin lines are spaced apart from a boundary of the second region;
    forming a first mandrel pattern layout on an entirety of the first region, using the first fin lines; and
    forming a first cut pattern layout on the entirety of the first region, using the first active fins.

9. The method as claimed in claim 8, further comprising:
    extracting a second design rule of the second active fins from the design layout;
    forming second fin lines completely overlapping the second active fins included in the second region such that the second fin lines have a greater length than the second active fins, wherein the second fin lines continuously extend from a position adjacent to one edge of the second region toward another edge;
    forming a second mandrel pattern layout on an entirety of the second region, using the second fin lines; and
    forming a second cut pattern layout on the entirety of the second region, using the second active fins.

10. The method as claimed in claim 8, wherein forming the first fin lines includes:
    setting a reference point within the first region of the semiconductor device;

forming some of the first fin lines meeting the first design rule from the reference point; and additionally forming a remainder of the first fin lines in the first region of the semiconductor device, according to the first design rule.

11. The method as claimed in claim 10, wherein the reference point:

is positioned collinear to any one of the first active fins, and is set as a point away from the one edge of the first region of the semiconductor device by a predetermined distance.

12. The method as claimed in claim 8, wherein:

the first fin lines are divided into a plurality of groups such that each of the groups includes four first fin lines, and the four first fin lines in each group have a same length.

13. The method of claim 12, wherein:

forming the first mandrel pattern layout includes forming, for each group, a first mandrel pattern having a same length as the first fin lines, the first mandrel pattern overlaps two of the first fin lines positioned in a central portion of each group.

14. The method as claimed in claim 9, wherein forming the second fin lines includes:

setting a reference point within the second region of the semiconductor device;

forming some of the second fin lines meeting the second design rule from the reference point; and additionally forming a remainder of the second fin lines in the second region of the semiconductor device, according to the second design rule.

15. The method as claimed in claim 14, wherein the reference point:

is positioned collinear to any one of the second active fins, and is set as a point away from the one edge of the second region of the semiconductor device by a predetermined distance.

16. The method as claimed in claim 9, wherein:

the second fin lines are divided into a plurality of groups, each of the groups includes two second fin lines, and the two second fin lines in each group have a same length.

17. The method as claimed in claim 16, wherein:

forming the second mandrel pattern layout includes forming, for each group, a second mandrel pattern having a same length as the second fin lines, the second mandrel pattern is disposed in a region between the two second fin lines.

18. A method of manufacturing a semiconductor device, the method comprising:

receiving a design layout of the semiconductor device including active fins;

extracting a design rule of the active fins from the design layout;

forming, in the semiconductor device, fin lines overlapping the active fins and extending to have a greater length than the active fins, wherein the fin lines continuously extend from a position adjacent to one edge of the semiconductor device toward another edge;

forming a mandrel pattern layout, using the fin lines;

forming a cut pattern layout, using the active fins;

forming a first photomask with the mandrel pattern layout;

forming a second photomask with the cut pattern layout; and forming the active fins by patterning a substrate, using the first photomask and the second photomask, wherein forming the active fins by patterning the substrate includes:

sequentially stacking a first sacrificial layer and a second sacrificial layer on the substrate;

forming first mandrels on the first sacrificial layer by patterning the second sacrificial layer, using the first photomask;

forming first spacers on side walls of the first mandrels;

removing the first mandrels;

forming second mandrels by etching the first sacrificial layer, using the first spacers as etching masks;

forming second spacers on side walls of the second mandrels;

removing the second mandrels;

forming the continuously extending fin lines by patterning the substrate, using the second spacers; and forming the active fins and dummy fins by cutting the fin lines, using the second photomask.

19. The method as claimed in claim 18, wherein forming the fin lines includes:

setting a reference point within the semiconductor device;

forming some of the fin lines meeting the design rule from the reference point; and additionally forming a remainder of the fin lines in the semiconductor device, according to the design rule.

* * * * *